(12) United States Patent
Joshi (10) Patent No.: US 9,990,150 B2
(45) Date of Patent: Jun. 5, 2018

(54) METHOD TO PROVIDE TRANSACTIONAL SEMANTICS FOR UPDATES TO DATA STRUCTURES STORED IN A NON-VOLATILE MEMORY

(71) Applicant: TOSHIBA MEMORY CORPORATION, Tokyo (JP)

(72) Inventor: Ratnadeep Joshi, Sunnyvale, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 14 days.

(21) Appl. No.: 15/077,688

(22) Filed: Mar. 22, 2016

(65) Prior Publication Data
US 2017/0277452 A1    Sep. 28, 2017

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)
(58) Field of Classification Search
CPC ..... G06F 3/0679; G06F 3/0619; G06F 3/0653
USPC ........................................................ 711/102
See application file for complete search history.

(56) References Cited

U.S. PATENT DOCUMENTS

| 7,310,711 B2 | 12/2007 | New et al. |
| 7,650,458 B2 | 1/2010 | Rogers et al. |
| 8,266,365 B2 | 9/2012 | Lasser |
| 9,075,708 B1 | 7/2015 | Kang et al. |
| 2015/0095600 A1 | 4/2015 | Bahnsen et al. |
| 2015/0160879 A1 | 6/2015 | Flynn et al. |
| 2015/0277794 A1* | 10/2015 | Tudor .................. G06F 3/0619 711/103 |

* cited by examiner

*Primary Examiner* — Jasmine Song
(74) *Attorney, Agent, or Firm* — Patterson & Sheridan, LLP (57) ABSTRACT

In a computing system that includes NVRAM, when an application modifies a data structure stored in NVRAM via a transaction, an interface creates a transaction log for the requested change to the data structure. The transaction log tracks or stores the initial value of each field of the data structure in NVRAM to be updated as part of the transaction. After all updates of the data structure have been implemented in nonvolatile RAM and the transaction is complete, the transaction is committed and the transaction log is deleted. If at any point the transaction is interrupted, for example due to an unexpected power loss or process crash, the initial, consistent values for the data structure are used upon start-up of the computing system or reinitialization of the process.

19 Claims, 8 Drawing Sheets

METHOD TO PROVIDE TRANSACTIONAL SEMANTICS FOR UPDATES TO DATA STRUCTURES STORED IN A NON-VOLATILE MEMORY

BACKGROUND

The use of distributed computing systems, e.g., "cloud computing," has become increasingly common for consumers and enterprises, especially for data storage. This so-called "cloud data storage" employs large numbers of networked storage servers that are organized as a unified repository for data, and are configured as banks or arrays of magnetic hard disk drives (HDDs) and/or solid-state drives (SSDs). Typically, these servers are arranged in high-density configurations to facilitate such large-scale operation. For example, a single cloud data storage system may include thousands or tens of thousands of storage servers installed in stacked or rack-mounted arrays.

Nonvolatile random-access memory (NVRAM) may be employed to reduce latency in such distributed computing systems, since NVRAM can serve as a smaller but much faster storage device than the HDDs and solid-state drives (SSDs) typically included in cloud data storage systems. Unlike conventional dynamic random-access memory (DRAM) and static random-access memory (SRAM), which both maintain data only for as long as power is applied, NVRAM is random-access memory that retains data when power is turned off (non-volatile). Various types of NVRAM are currently being developed, including NOR flash memory, ferroelectric RAM (F-RAM or Fe-RAM), magnetoresistive RAM (MRAM), and phase-change RAM (PRAM), among others.

As noted, RAM write operations to such NVRAM devices are typically performed one or more orders of magnitude faster than HDD random write operations, while the data included in the write operation are still considered to be safely stored in a nonvolatile medium. Consequently, when receiving a write or PUT command from a client or host, a storage device that includes NVRAM can return an acknowledgement to the client or host indicating that the write or PUT command is complete as soon as the data associated with the command is stored in the NVRAM. Thus, the acknowledgement is returned much more quickly than from a storage device that does not include NVRAM, which must wait until the data associated with the write or PUT command has been written to a magnetic disk.

However, the use of NVRAM has a potential drawback. Specifically, if an unexpected power loss, reboot, or process crash event occurs while a program is updating a data structure, the partial update can leave the data structure in an inconsistent state leading to unpredictable consequences.

SUMMARY

One or more embodiments provide systems and methods that may be employed in a computing system that includes nonvolatile RAM. In some embodiments, when an application modifies a data structure stored in nonvolatile RAM via a transaction, an interface can be called by the application to ensure that the data structure is consistent before, during, and after execution of the transaction. Specifically, the interface creates a transaction log for the requested change to the data structure, where the transaction log tracks or stores the initial value of each field of the data structure in nonvolatile RAM to be updated as part of the transaction. After all updates of the data structure have been implemented in nonvolatile RAM and the transaction is complete, the transaction is committed and the transaction log is deleted. If at any point the transaction is interrupted, for example due to an unexpected power loss or process crash, the initial, consistent values for the data structure are used upon start-up of the computing system or reinitialization of the process. Thus, the partially implemented transaction has no effect on the consistency of the data structure.

A method of atomically updating a data structure being stored in a nonvolatile random access memory (NVRAM) with first and second new values, according to an embodiment, includes the steps of recording in a transaction log in the NVRAM a first old value that is updated by the first new value, storing the first new value for updating the data structure in the NVRAM, recording in the transaction log a second old value that is updated by the second new value, storing the second new value for updating the data structure in the NVRAM, and deleting the transaction log upon completion of the steps of storing the first and second new values in the NVRAM.

A method to update a data structure stored in a nonvolatile random access memory (NVRAM), according to an embodiment, includes detecting that (a) a power loss event has occurred in which power is interrupted to a computing device that includes the NVRAM or (b) a process crash event has occurred in an application associated with the data structure, responsive to the detecting, determining that a transaction log associated with the data structure is stored in the NVRAM, reading a first old value and a second old value from the transaction log, and updating the data structure with the first old value and the second old value.

A computing device, according to another embodiment, includes a nonvolatile random access memory configured to store a data structure, a memory that stores a transaction service algorithm, and a processor that is coupled to the memory and the NVRAM. When executing the transaction service algorithm, the processor is configured to record in a transaction log in the NVRAM a first old value that is updated by the first new value, store the first new value for updating the data structure in the NVRAM, record in the transaction a second old value that is updated by the second new value, store the second new value for updating the data structure in the NVRAM, and delete the transaction log upon completion of the steps of storing the first and second new values in the NVRAM.

DETAILED DESCRIPTION

Figure 1:
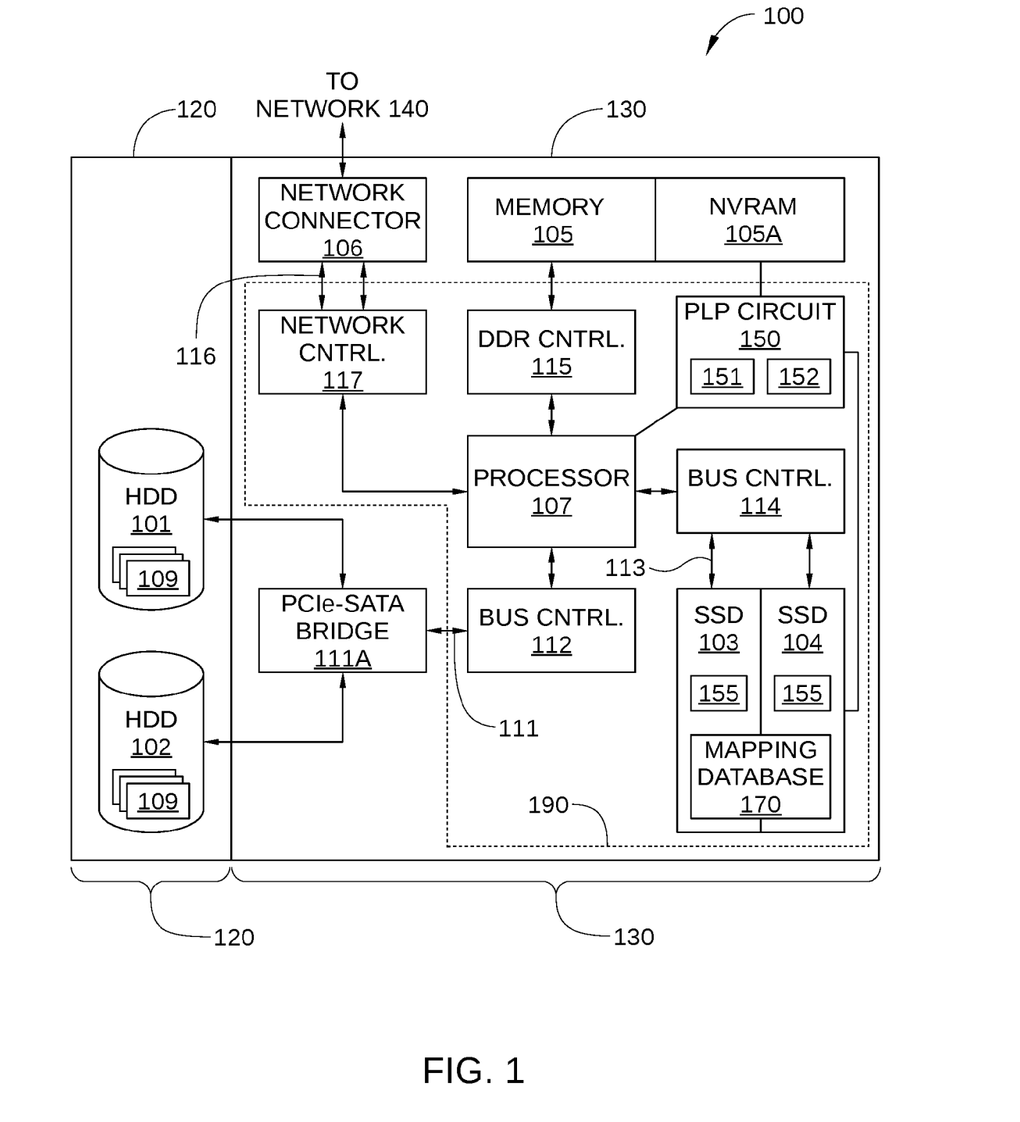
FIG. 1 is a block diagram of a data storage system that includes nonvolatile random-access memory (NVRAM), configured according to one or more embodiments.

FIG. 1 is a block diagram of a data storage system 100, configured according to one or more embodiments. Data storage system 100 may be configured to provide data storage capacity as one of a plurality of object servers of a cloud storage system (not shown), and is connected directly to a network 140. Network 140 may be any technically feasible type of communications network that allows data to be exchanged between clients and data storage system 100. For example, network 140 may include a wide area network (WAN), a local area network (LAN), a wireless (WiFi) network, and/or the Internet, among others.

In some embodiments, data storage system 100 may be an object-based storage system, which manipulates data in flexible-sized data units of storage called "objects." These objects generally include a set of data, also referred to as a "value," and an identifier, referred to as a "key", which together form a "key-value pair." In addition to the key and value, such objects may include other attributes or metadata, for example a version number and data integrity checks of the value portion of the object. The key facilitates storage, retrieval, and other manipulation of the associated value by data storage system 100, independent of the specific physical storage location or locations of the object in distributed storage system 100 (such as a specific location in a particular storage device). This approach simplifies and streamlines data storage in cloud computing, since a client can make data storage requests directly to a particular data storage system 100 without consulting a large data structure describing the entire addressable space of distributed storage system 100.

In the embodiment illustrated in FIG. 1, data storage system 100 includes two hard disk drives (HDDs) 101 and 102, one or more solid-state drives (SSDs) 103 and 104, a memory 105, a network connector 106, and a power loss protection (PLP) circuit 150, all connected to a processor 107 as shown. Data storage system 100 also includes a support frame 120, on which HDD 101 and HDD 102 are mounted, and a printed circuit board (PCB) 130, on which SSDs 103 and 104, memory 105, network connector 106, and processor 107 are mounted. In alternative embodiments, SSDs 103 and 104, memory 105, network connector 106, processor 107, and PLP circuit 150 may be mounted on two or more separate PCBs, rather than the single PCB 130.

HDDs 101 and 102 are magnetic disk drives that provide storage capacity for cloud storage system 100, storing data (objects 109) when requested by external clients via network 140, where each object may include one or more key-value pairs. In the embodiments illustrated herein, HDDs 101 and 102 are shingled magnetic recording (SMR) drives, the operation of which is described in further detail below in conjunction with FIG. 2. In other embodiments, HDDs 101 and 102 may be conventional HDDs with non-overlapping tracks. HDDs 101 and 102 store objects 109 in physical locations of the magnetic media contained in HDD 101 and 102, i.e., in sectors of HDD 101 and/or 102. HDDs 101 and 102 are connected to processor 107 via a bus 111, such as a PCIe bus, and a bus controller 112, such as a PCIe controller. HDDs 101 and 102 may each be a 2.5-inch form-factor HDD that is configured to conform to the 2.5-inch form-factor specification for HDDs (i.e., the so-called SFF-8201 specification). In some embodiments, HDDs 101 and 102 are arranged on support frame 120 so that they conform to the 3.5-inch form-factor specification for HDDs (i.e., the so-called SFF-8301 specification).

SSD 103 and 104 are each connected to processor 107 via a bus 113, such as a SATA bus, and a bus controller 114, such as a SATA controller. SSDs 103 and 104 are configured to store a mapping table 170 that associates each object 109 with a set of logical block addresses (LBAs) of HDD 101 and/or HDD 102, where each LBA corresponds to a unique physical location in either HDD 101 or HDD 102 that is part of the addressable space of data storage system 100. Thus, whenever a new object 109 is stored in HDD 101 and/or HDD 102, mapping table 170 is updated, for example by host software 121. Mapping table 170 may be partially stored in SSD 103 and partially stored in SSD 104, as shown in FIG. 1. Alternatively, mapping table 170 may be stored entirely in SSD 103 or entirely in SSD 104. Because mapping table 170 is not stored on HDD 101 or HDD 102, mapping table 170 can be updated more quickly and without causing HDD 101 or HDD 102 to interrupt the writing of object data to perform the updating of mapping table 170.

Because the combined storage capacity of HDD 101 and HDD 102 can be 6 TB or more, mapping table 170 may occupy a relatively large portion of SSD 103 and/or SSD 104, and SSDs 103 and 104 are sized accordingly. For example, in an embodiment of data storage system 100 configured for 4 KB objects (i.e., 250 objects per MB), assuming that 8 bytes are needed to map each object plus an additional 16 bytes for a UUID, mapping table 170 can have a size of 78 GB or more. In such an embodiment, SSDs 103 and 104 may each be a 240 GB M.2 form-factor SSD, which can be readily accommodated by PCB 130.

In some embodiments, SSDs 103 and 104 are also configured to include one or more reserved regions 155 for storing data copied from a nonvolatile buffer 123 in memory 105 in the event of unexpected power loss. More specifically, when power loss is detected, reserved regions 155 may be configured to store key-value pairs recently received by data storage system 100 from external clients and stored in nonvolatile buffer 123, thereby effectively making a portion of volatile memory 105 a nonvolatile buffer. The operation of such a nonvolatile buffer and of PLP circuit 150, in response to unexpected power loss, is described below.

Memory 105 includes one or more solid-state memory devices or chips, such as an array of volatile dynamic random-access memory (DRAM) chips. For example, in some embodiments, memory 105 includes four or more double data rate (DDR) memory chips. In such embodiments, memory 105 is connected to processor 107 via a DDR controller 115. In some embodiments, memory 105 may include a nonvolatile RAM (NVRAM) 105A, or be comprised entirely of NVRAM. Although in some embodiments NVRAM 105A may be formed with volatile RAM, such as dynamic RAM, NVRAM 105A can be considered nonvolatile because memory 105, processor 107, and SSD 103 and/or 104 are all coupled to PLP circuit 150. Consequently, upon detection of power loss to data storage system 100, data stored in NVRAM 105A can be stored in one or more reserved regions 155 in SSDs 103 and/or 104, and is not lost despite the loss of power to data storage system 100.

Alternatively or additionally, in some embodiments, NVRAM 105A may include one or more NVRAM devices that operate normally as nonvolatile memory, such as NOR flash memory, ferroelectric RAM (F-RAM or Fe-RAM), magnetoresistive RAM (MRAM), phase-change RAM (PRAM), or any other technically feasible NVRAM device.

Consequently, as used herein, the term "NVRAM" may refer to one or more DRAM devices that are coupled to PLP circuit 150 and are effectively nonvolatile, and NVRAM devices that operate normally as nonvolatile memory, such as FeRAM, MRAM, NOR flash memory, and the like, or any combination thereof. One embodiment of NVRAM 105A is shown in FIG. 2.

Figure 2:
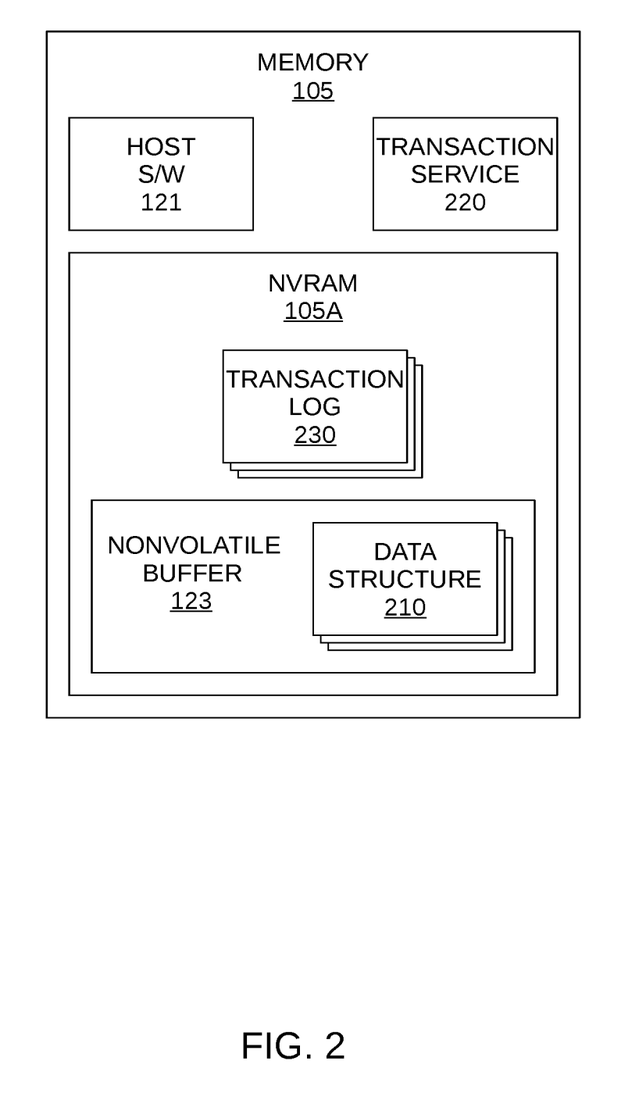
FIG. 2 is a block diagram of an NVRAM of the data storage system in FIG. 1, configured according to one or more embodiments.

FIG. 2 is a block diagram of NVRAM 105A, configured according to one or more embodiments. As noted above, NVRAM 105A may include any technically feasible NVRAM device or devices, including one or more conventional volatile DRAM devices that are coupled to PLP circuit 150 and are effectively nonvolatile. During operation, host software 121 and a transaction service 220 may reside in memory 105, while nonvolatile buffer 123, one or more transaction logs 230, and one or more data structures 210 may reside in NVRAM 105A. In some embodiments, the one or more data structures 210 may be stored in nonvolatile buffer 123.

Host software 121 is configured to perform management tasks associated with cloud storage system 100 and thereby provide the functionality of a host or object server that receives GET, PUT, and DELETE commands from clients via network 140. Host software 121 enables efficient storage of object data, received from clients external to data storage system 100, in HDDs 101 and 102. Nonvolatile buffer 123 is configured to store key-value pairs received from a client or clients external to data storage system 100, in particular the key-value pairs most recently received by data storage system 100.

Data structure 210 may include data structures created in NVRAM 105A by host software 121 and/or other applications running on processor 107 of data storage system 100. In general, each data structure 210 includes multiple values that may be assumed by the application that created the data structure to be consistent and updated atomically. That is, the application creating a particular data structure 210 in NVRAM 105A generally operates on the assumption that either all fields of the particular data structure 210 are updated or none of the fields of the particular data structure 210 are updated. For example, when host software 121 stores a key-value pair in nonvolatile buffer 123, host software 121 creates a data structure 210 that includes a value stored at one physical location in nonvolatile buffer 123 for the key-value pair and a value stored at another physical location in nonvolatile buffer 123 for metadata associated with the key-value pair. Host software 121 then operates on the assumption that these two values in the data structure are only updated simultaneously. For instance, when a key-value pair is updated by host software 121 in nonvolatile buffer 123, the value for the key-value pair and the value for the metadata associated with the key-value pair are both modified in a single transaction initiated by host software 121.

Transaction service 220 is an interface for applications running on processor 107 that is configured to enable implementation of transactions in NVRAM 105A with atomic guarantees. Specifically, for a transaction that updates one of data structures 210, transaction service 220 creates a transaction log 230 in NVRAM 105A that tracks or stores the initial value of each field of the data structure 210 to be updated as part of the transaction. After each field of the data structure 210 has been implemented in NVRAM 105A and the transaction is complete, transaction service 220 is configured to receive a transaction commit request from host software 121 (or other application), and the transaction log is deleted. If at any point the transaction is interrupted, for example due to an unexpected power loss or process crash, the initial, consistent values for the data structure 210 stored in or tracked by the transaction log 230 associated with the transaction are used upon start-up of data storage system 100 or upon reinitialization of the process of which the interrupted transaction was a part. Thus, a partially implemented transaction has no effect on the consistency of the data structure 210. The functionality of transaction service 220 is described in greater detail below in conjunction with FIG. 4.

Transaction service 220 may be any technically feasible software, firmware, or hardware construct configured to implement the functionality described herein. For example, in the embodiment illustrated in FIG. 2, transaction service 220 resides in memory 105, such as when transaction service 220 is configured as a driver, a daemon, or a library. However, in other embodiments, some or all functionality of transaction service 220 may be implemented as firmware and/or hardware included in processor 107, or located elsewhere in data storage device 100.

Each transaction log 230 is created in NVRAM 105A by transaction service 220 for a particular transaction that updates a particular data structure 210. Each transaction log 230 may include metadata associating a particular transaction with a particular data structure 210. Each transaction log 230 may also include either the previous values of the data structure 210 being updated by the transaction or a pointer referencing the memory location in NVRAM 105A at which these previous values of the data structure 210 are stored. As shown, multiple transaction logs 230 may reside in NVRAM 105A at one time, since multiple transactions may be started but not yet committed by different threads at any particular time.

Returning to FIG. 1, network connector 106 enables one or more network cables to be connected to data storage system 100 and thereby connected to network 140. For example, network connector 106 may be a modified SFF-8482 connector. As shown, network connector 106 is connected to processor 107 via a bus 116, for example one or more serial gigabit media independent interfaces (SGMII), and a network controller 117, such as an Ethernet controller, which controls network communications from and to data storage system 100.

Processor 107 may be any suitable processor implemented as a single core or multi-core central processing unit (CPU), a graphics processing unit (GPU), an application-specific integrated circuit (ASIC), a field programmable gate array (FPGA), or another type of processing unit. Processor 107 is configured to execute program instructions associated with the operation of data storage system 100 as an object server of cloud storage system 100, including receiving data from and transmitting data to clients external to cloud storage system 100, buffering received key-value pairs in nonvolatile buffer 123, and recording a mapping of each received key to a physical location in HDD 101 or 102 in mapping table 170. In some embodiments, processor 107 and one or more other fields of data storage system 100 may be formed as a single chip, such as a system-on-chip (SOC) 190. In the embodiment illustrated in FIG. 1, SOC 190 includes bus controller 112, bus controller 114, DDR controller 115, and network controller 117. Furthermore, in some embodiments, processor 107 may be shared for use by other functions of data storage system 100, such as managing the mechanical functions of HDDs 101 and 102 and/or the data storage functions of SSDs 103 and 104.

PLP circuit 150 is configured to power memory 105 or NVRAM 105A, processor 107, and SSDs 103 and 104 for a short but known time interval, thereby allowing data stored in memory 105 to be copied to the one or more reserved regions 155 of SSDs 103 and/or 104 in the event of unexpected power loss. Advantageously, a portion of memory 105 can be employed as a smaller, but much faster mass storage device than SSDs 103 or 104, since DRAM write operations are typically performed orders of magnitude faster than NAND write operations. Thus, processor 107 may cause data received by data storage system 100 from an external client to be initially stored in memory 105 rather than in SSDs 103 or 104; PLP circuit 150 allows some or all of memory 105 to temporarily function as non-volatile memory, and data stored therein will not be lost in the event of unexpected power loss to data storage system 100. As shown, PLP circuit 150 includes a management integrated circuit (IC) 151 and a temporary power source 152.

Management IC 151 is configured to monitor an external power source (not shown) and temporary power source 152, and to alert processor 107 of the status of each. Management IC 151 is configured to detect interruption of power from the external power source, to alert processor 107 of the interruption of power, and to switch temporary power source 152 from an "accept power" mode to a "provide power" mode. Thus, when an interruption of power from the external power source is detected, data storage system 100 can continue to operate for a finite time, for example a few seconds or minutes, depending on the charge capacity of temporary power source 152. During such a time, processor 107 can copy data stored in memory 105 to reserved regions 155 of SSD 103 or 104. Furthermore, upon power restoration from the external power source, PLP circuit 150 is configured to copy data stored in reserved regions 155 back to memory 105.

Management IC 151 also monitors the status of temporary power source 152, notifying processor 107 when temporary power source 152 has sufficient charge to power processor 107, memory 105, and SSDs 103 and 104 for a minimum target time. Generally, the minimum target time is a time period that is at least as long as a time required for processor 107 to copy data stored in memory 105 to reserved region 155. For example, in an embodiment in which the storage capacity of memory 105 is approximately 1 gigabyte (GB) and the data rate of SSD 103 and 104 is approximately 650 megabytes (MBs) per second, the minimum target time may be up to about two seconds. Thus, when management IC 151 determines that temporary power source 152 has insufficient charge to provide power to processor 107, memory 105, and SSDs 103 and 104 for two seconds, management IC 151 notifies processor 107. In some embodiments, when temporary power source 152 has insufficient charge to power processor 107, memory 105, and SSDs 103 and 104 for the minimum target time, processor 107 does not make NVRAM 105A available for temporarily storing write data.

Temporary power source 152 may be any technically feasible device capable of providing electrical power to processor 107, memory 105, and SSDs 103 and 104 for a finite period of time, as described above. Suitable devices includes rechargeable batteries, dielectric capacitors, and electrochemical capacitors (also referred to as "supercapacitors"). The size, configuration, and power storage capacity of temporary power source 152 depends on a plurality of factors, including power use of SSDs 103 and 104, the data storage capacity of memory 105, the data rate of SSDs 103 and 104, and space available for temporary power source 152. One of skill in the art, upon reading this disclosure herein, can readily determine a suitable size, configuration, and power storage capacity of temporary power source 152 for a particular embodiment of data storage system 100.

Figure 3:
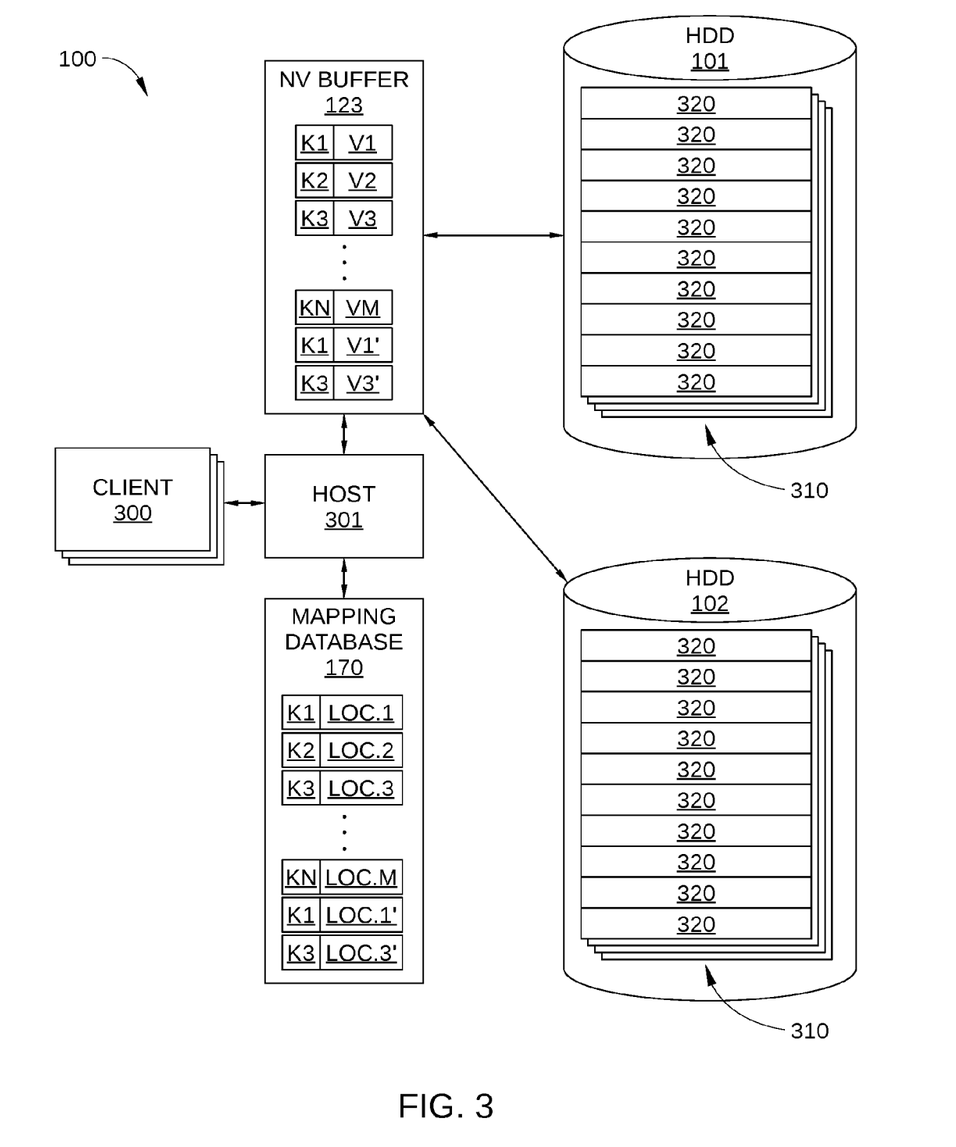
FIG. 3 is a block diagram illustrating the storage of object data received by the data storage system of FIG. 1 from one or more external clients, according to one or more embodiments.

FIG. 3 is a block diagram illustrating the storage of object data received by data storage system 100 from one or more external clients 300, according to one or more embodiments. As shown, nonvolatile buffer 123 is configured to store a plurality of key-value pairs K1-V1, K2-V2, . . . KN-VM received from one or more external clients 300 by a host 301 associated with data storage device 100. For example, each of clients 300 may be a web-based application or any other technically feasible storage client, and host 301 may be host software 121 running on processor 107 in FIG. 1. Mapping table 170 is configured to store a mapping of keys K1-KN to respective locations 1-N. For ease of description, keys K1-KN are depicted as listed in mapping table 170 in the order received by data storage system 100.

HDDs 101 and 102 are each configured to include a plurality of sequential write regions 310. Each of sequential write regions 310 is a contiguous area of HDD 101 or HDD 102, such as a group of adjacent data tracks, and includes multiple slabs 320 for storing data. In some embodiments, each sequential write region 310 corresponds in size and configuration to a shingled magnetic recording (SMR) "band" or "zone." Thus, in such embodiments, each sequential write region 310 includes a plurality of slightly overlapping data tracks, and is separated from adjacent sequential write regions 310 by a guard space. By contrast, slabs 320 are generally not separated by a guard space, so that the final sector of one band 320 is adjacent to the first sector of the immediately following band 320. Sequential write regions 310 may be on the order of 256 MB or larger. In some embodiments, each slab 320 is sized to store the same quantity of data as nonvolatile buffer 123 or a write buffer included in nonvolatile buffer 123, so that each slab 320 can store the entire contents of nonvolatile buffer 123 (or the write buffer) when flushed. For example, in some embodiments, nonvolatile buffer 123 and each slab 320 may be sized to store 16 MB of data. In other embodiments, the size of nonvolatile buffer 123 and each slab 320 may be any other technically feasible size, for example 8 MB, 32 MB, etc.

Locations 1-M are physical locations in HDD 101 or HDD 102 that are assigned for storing key-value pairs. In general, each of locations 1-M is selected to include the next available sectors in HDD 101 or HDD 102 for storing object data. In the embodiment illustrated in FIG. 3, key K1 of key-value pair K1-V1 is mapped to location 1 in mapping table 170, and location 1 is therefore assigned to store the data associated with value V1 of key-value pair K1-V1. Similarly, key K2 of key-value pair K2-V2 is mapped to location 2, which is assigned to store the data associated with value V2 of key-value pair K2-V2, key K3 of key-value pair K3-V3 is mapped to location 3, which is assigned to store the data associated with value V3 of key-value pair K3-V3, and so on. Because key K2 is the first key received after key K1, location 2 includes the sector or sectors of HDD 101 or HDD 102 immediately following the sectors of location 1. In the same vein, because key K3 is the first key received after key K2, location 3 includes the sector or sectors immediately following sectors of location 2. Thus, when the contents of nonvolatile buffer 123 are flushed to locations 1-N in HDD 101 or HDD 102, said contents can be written in a single sequential write operation.

It is well-known in the art that a quantity of data can be stored by a magnetic storage device at a significantly higher rate in a single sequential write than as a large number of randomly located writes. Therefore, by buffering received key-value pairs in nonvolatile buffer 123, and writing the contents of nonvolatile buffer 123 to HDD 101 or 102 in a single sequential write operation, data storage system 100 can efficiently store object data received from clients 300, freeing HDD 101 and 102 to perform other tasks as data are buffered in nonvolatile buffer 123. For example, HDD 101 or HDD 102 can perform a compaction process on one or more sequential write regions 310 as data are buffered in nonvolatile buffer 123.

The number M of locations mapped by data storage device 100 in mapping table 170 is a function of the total data storage capacity of HDDs 101 and 102 and the minimum size of key-value pairs accepted by data storage device 100. Given that the data storage capacity of HDDs 101 and 102 may be on the order of several terabytes, M may have a value on the order of 10s or 100s of millions. Locations 1-M may be indicated in any suitable fashion in mapping table 170, for example by a sequential group of LBAs that correspond to the next available sectors in HDD 101 or HDD 102, or an offset and number of sectors suitable for storing the data mapped to that location.

When assigned for storing a specific key-value pair, each of locations 1-M is disposed within a sequential write region 310 that is either empty or active, and is not disposed within a sequential write region 310 that is either occupied or compacting. A sequential write region 310 is in an empty state when no key-value pairs are stored therein, and is therefore available for storing key-value pairs. A sequential write region 310 is in an active state when key-value pairs are stored therein, but there is still available storage capacity for storing additional key-value pairs, for example, when one or more slabs in that particular sequential write region 310 are empty and available for storing key-value pairs flushed from nonvolatile buffer 123. A sequential write region 310 is in an occupied state when key-value pairs are stored therein and there is no available storage capacity for storing additional key-value pairs, for example, when all slabs 320 in that particular sequential write region 310 store key-value pairs that have been flushed from nonvolatile buffer 123. In some embodiments, only a single sequential write region 310 may be in an active state in each of HDDs 101 and 102. In other embodiments, multiple sequential write regions 310 may be in an active state in a particular HDD.

Figure 4:
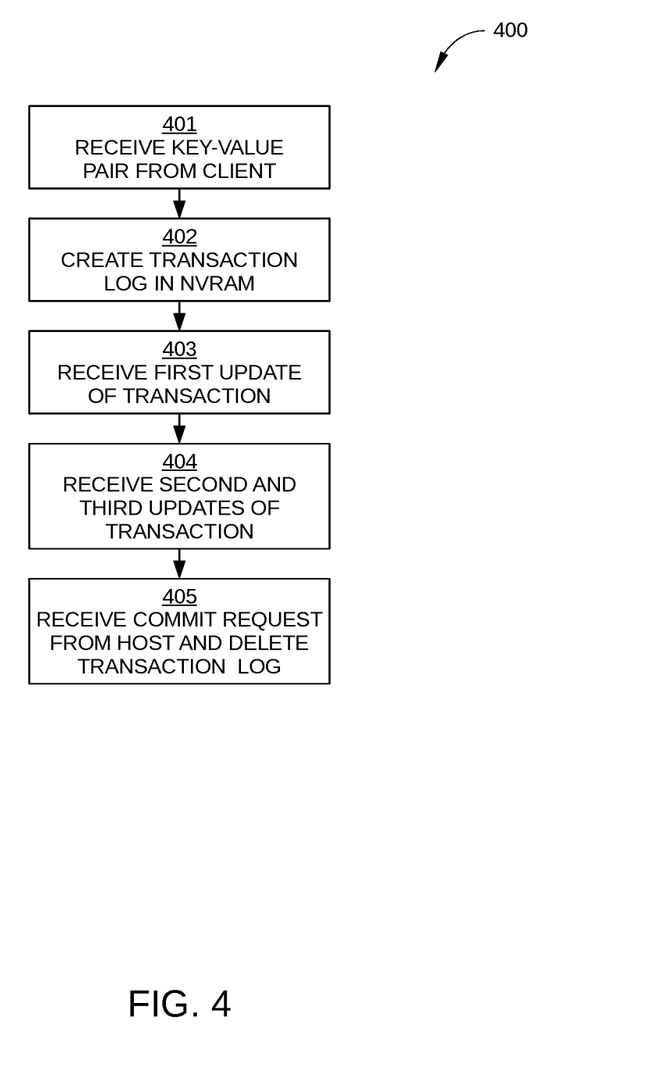
FIG. 4 sets forth a flowchart of method steps carried out by the data storage system of FIG. 1 when atomically updating a data structure with new values, according to one or more embodiments.

FIG. 4 sets forth a flowchart of method steps carried out by data storage system 100 when atomically updating a data structure with new values, according to one or more embodiments. FIGS. 5A-5E are block diagrams illustrating implementation in NVRAM 105A of the various method steps of FIG. 4, according to one or more embodiments. Although the method steps in FIG. 4 are described in conjunction with data storage system 100 of FIGS. 1-3, persons skilled in the art will understand that the method in FIG. 4 may also be performed with other types of computing systems, for example, any computing system that includes one or more NVRAM devices.

Figure 5A:
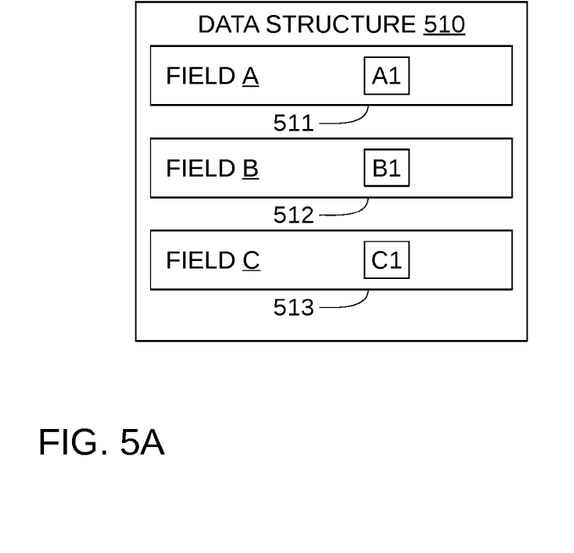
FIGS. 5A-5E are block diagrams illustrating implementation in a nonvolatile random access memory of the data storage system of FIG. 1 of the various method steps of FIG. 4, according to one or more embodiments.

Prior to the method steps, a data structure 510 is created in NVRAM 105A, as shown in FIG. 5A. Data structure 510 may be created by any application configured for use with NVRAM 105A, such as host software 121 or any other application running on processor 107 that employs NVRAM 105A for storage of at least some data structures. Data structure 510 includes multiple fields, for example field A, field B, and field C, each with an associated value stored in a physical location in NVRAM 105A. In the embodiment illustrated in FIG. 5A, field A has an original value A1 associated therewith, field B has an original value B1 associated therewith, and field C has an original value C1 associated therewith. The value associated with each field is stored in a different physical location in NVRAM 105A. Thus, original value A1 is stored in a physical location 511, original value B1 is stored in a physical location 512, and original value C1 is stored in a physical location 513, as shown.

In some embodiments, data structure 510 includes metadata for key-value pairs stored in nonvolatile buffer 123 that are to be written to HDD 101 or HDD 102 as described above. In such embodiments, each field in data structure 510 may include information that enables the flushing of nonvolatile buffer 123 to one of slabs 320. For example, field A may include a value indicating the number of objects currently stored in buffer nonvolatile buffer 123; field B may include a duplicate key for each object (such as key-value pair K1-V1, K2-V2, etc.) stored in nonvolatile buffer 123; field C may include a pointer with a value that indicates where the next object stored in nonvolatile buffer 123 can be written to in HDD 101 or HDD 102, and so on. According to some embodiments, when an additional object is stored in nonvolatile buffer 123, host 301 updates the respective values of field A, field B, and field C of data structure 510 via a single atomic transaction, as described below, so that data structure 510 remains consistent before, during, and after the transaction. While data structure 510 is illustrated with only three fields in FIGS. 5A-5E, each data structure 510 in nonvolatile buffer 123 may include any suitable number of fields.

As shown, a method 400 begins at step 401, in which transaction service 220 receives a request to create a transaction log 230 in NVRAM 105A. For example, in some embodiments, host 301 receives a PUT command from one of external clients 300 that includes object data, such as a key-value pair. The key-value pair may be a newer version of a key-value pair that is already stored in nonvolatile buffer 123, or may be a new key-value pair. In either case, the values of all three fields of data structure 510, i.e., fields A, B, and C, will be updated via a single atomic transaction, as detailed below. Generally, the single atomic transaction includes multiple update operations, one for each of the individual fields A, B, and C of data structure 510.

Figure 5B:
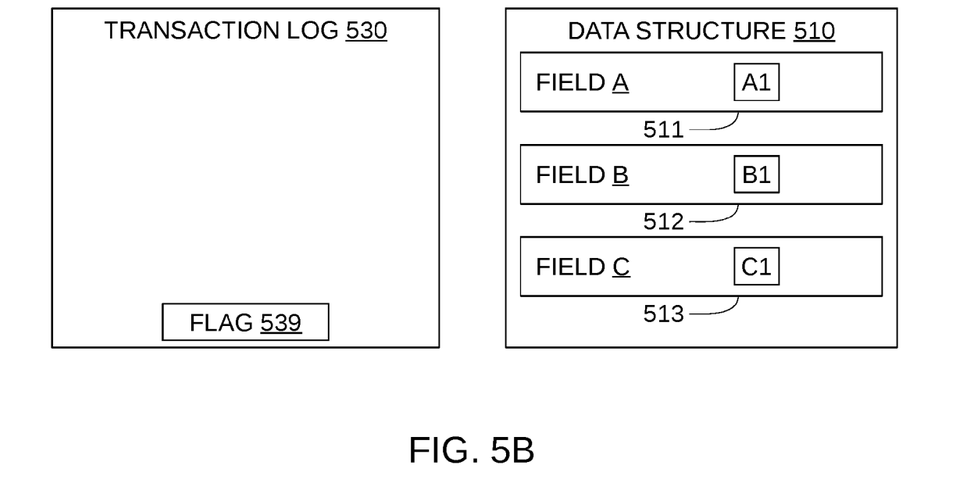

In step 402, responsive to the request received in step 401, transaction service 220 creates transaction log 530 in NVRAM 105A, as shown in FIG. 5B. In some embodiments, transaction log 530 includes a flag 539, such as a flag, register, or other indicator, that is configured to indicate to host software 121 (and/or any other application configured to employ NVRAM 105A as memory) that data contained in transaction log 530 is either valid or invalid.

Figure 5C:
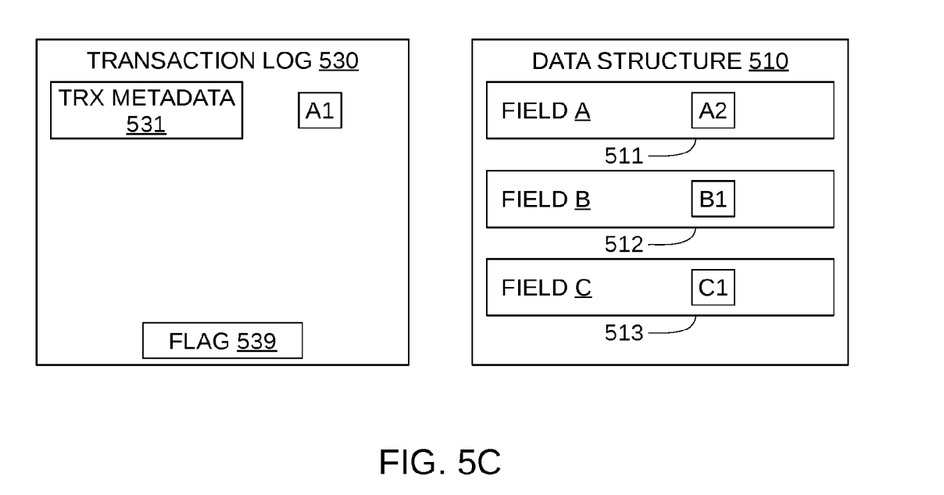

In step 403, transaction service 220 receives a first update of the transaction that is changing the values of fields A, B, and C of data structure 510, where the first update changes the value of field A. Accordingly, a new value for field A, i.e., value A2, is stored in NVRAM 105A in physical location 511, and transaction service 220 populates transaction log 530 with transaction metadata 531 and old value A1, as shown in FIG. 5C. Transaction metadata 531 includes metadata associating old value A1 with the current transaction, field A, and physical location 511, in which the initial value for field A, i.e., old value A1, was stored. Thus, in the embodiment illustrated in FIG. 5C, new value A2 overwrites old value A1 in physical location 511. In some embodiments, in step 403 transaction service 220 also changes a value of flag 539 to indicate that data referenced or contained in transaction log 530 is now valid, and should be used for data structure 510 when recovering from an unexpected power loss or process crash. In other embodiments, transaction service 220 may employ any other technically feasible indicator associated with data structure 510 to indicate that data referenced or contained in transaction log 530 is now valid.

It is noted that, in a conventional computing device, if an unexpected power loss event or process crash associated with the application updating data structure 510 were to occur after the completion of step 403 and before the completion of step 404, data structure 510 would be inconsistent. Specifically, after step 403, the value of field A is updated to reflect the value associated with the new metadata associated with data structure 510, i.e., new value A2, while the respective values of field B and field C reflect previous values of the metadata associated with data structure 510, i.e., old values B1 and C1. Thus, at the completion of step 403, data structure 510 is corrupted with a combination of new and old values, and this inconsistent combination would be used by host software 121 when recovering from the power loss event or process crash. Further, such inconsistency is generally is not detectable by host software 121. However, according to various embodiments described herein, the transaction for updating data structure 510 in NVRAM 150A is guaranteed to be atomic, thereby avoiding such a situation.

Figure 5D:
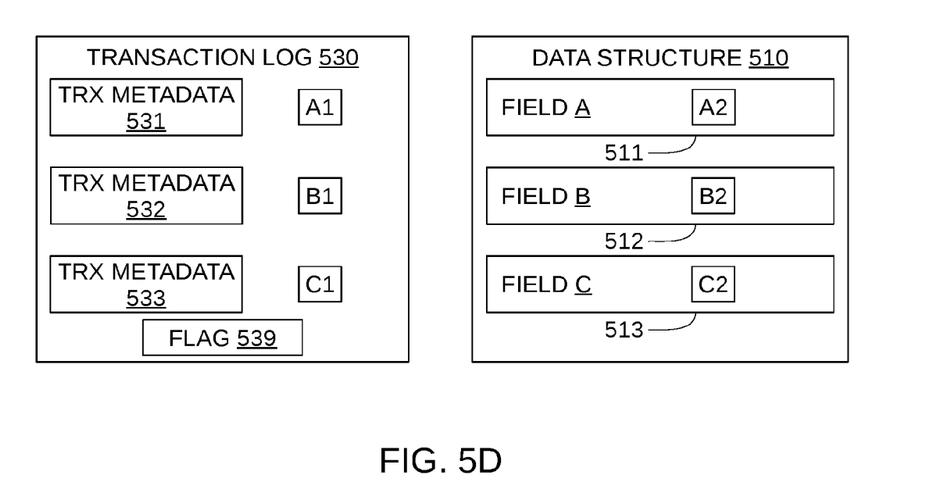

In step 404, transaction service 220 receives a second update and a third update of the transaction that is changing the values of fields A, B, and C of data structure 510, where the second update changes the value of field B and the third update changes the value of field C. Accordingly, a new value for field B, i.e., new value B2, is stored in NVRAM 105A in physical location 512, and a new value for field C, i.e., new value C2, is stored in NVRAM 105A in physical location 513, as shown in FIG. 5D. In addition, transaction service 220 populates transaction log 530 with transaction metadata 532, old value B1, transaction metadata 533, and old value C1, as shown in FIG. 5D. Transaction metadata 532 includes metadata associating old value B1 with the current transaction, field B, and physical location 512, in which old value B1 was originally stored. Similarly, transaction metadata 533 includes metadata associating old value C1 with the current transaction, field C, and physical location 513, in which old value C1 was stored originally stored.

Figure 5E:
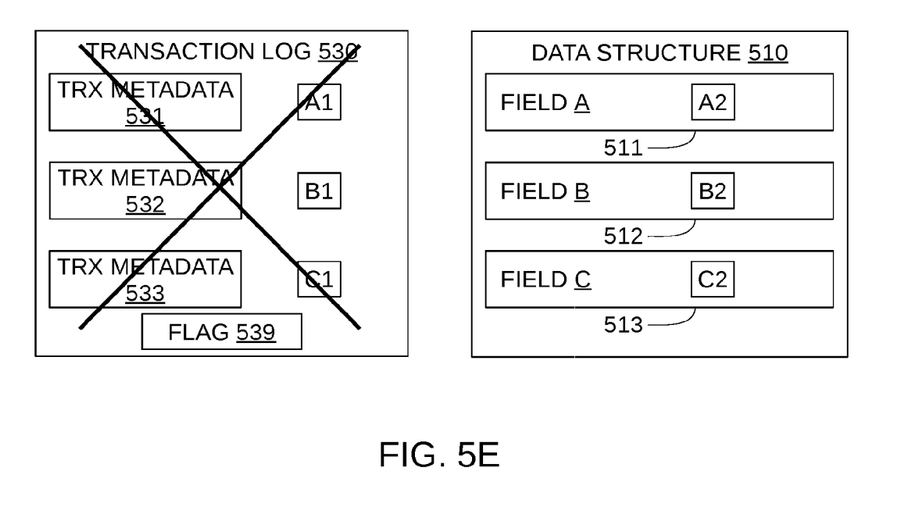

In step 405, transaction service 220 receives a commit request from host software 121. Responsive to the request received in step 405, transaction service 220 deletes or otherwise indicates as invalid the transaction log 530 created in step 402, as shown in FIG. 5E. For example, in some embodiments, transaction service 220 changes a value of flag 539 to indicate that data contained in transaction log 530 is now invalid. Consequently, host software 121 and/or other applications configured to employ NVRAM 105A as memory will not use old values A1, B1, or C1 for data structure 510 when recovering from an unexpected power loss or process crash.

In an alternative embodiment, transaction service 220 stores all old values of data structure 510 when new value A2 is received in step 403, i.e., old values A1, B1, and C1. Thus, in such embodiments, whenever flag 539 indicates that data referenced or contained in transaction log 530 is now valid, transaction log 530 includes values for all fields of data structure 510.

Embodiments of method 400, as described above, ensure that data structure 510 is consistent before, during, and after values in data structure 510 are changed via a transaction. Specifically, when recovering from an unexpected power loss or process crash that occurs during a transaction that updates data structure 510, host software 121 will use the values referenced or stored in transaction log 530 for data structure 510, rather than the most recently updated values in data structure 510. This is because flag 539 indicates that transaction log 530 contains valid data. Conversely, when recovering from an unexpected power loss or process crash that occurs after a transaction that updates data structure 510 has completed, host software 121 will use the most recently updated values in data structure 510, and not values referenced or stored in transaction log 530. This is because flag 539 indicates that transaction log 530 contains invalid data, or transaction log 530 has been deleted. Therefore, because either all of the updates of the transaction are implemented or none of the updates of the transaction are implemented, regardless of the timing of unexpected power loss or a process crash, the transaction updating data structure 510 is implemented with atomic guarantees in NVRAM 105A.

Figure 6:
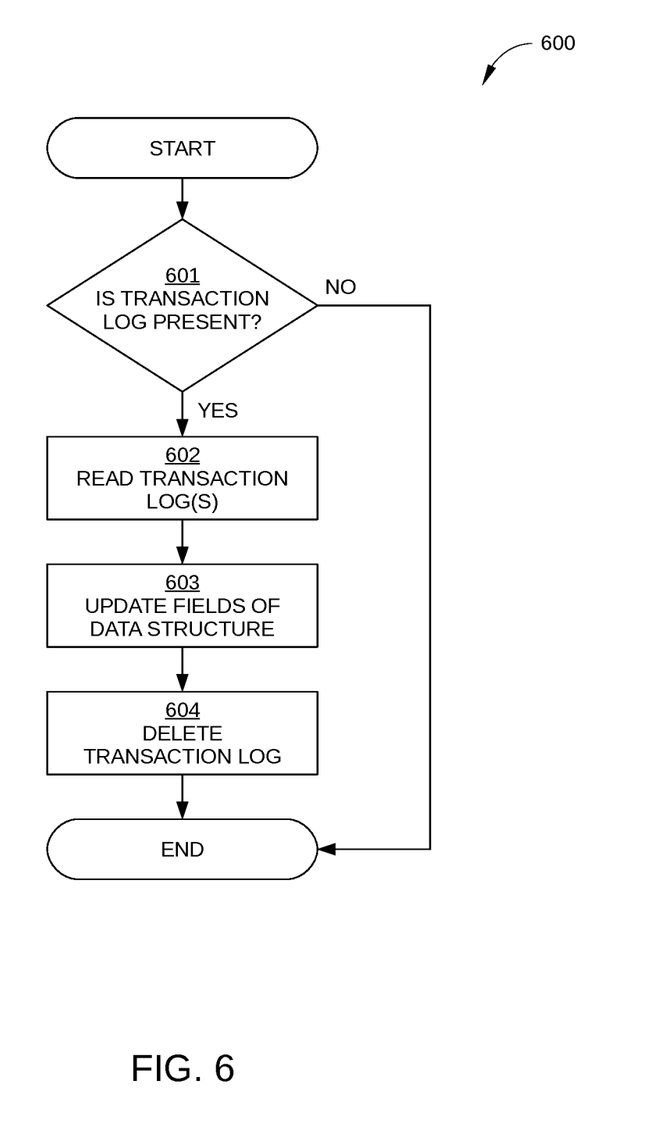
FIG. 6 sets forth a flowchart of method steps carried out by the data storage system of FIG. 1 when recovering from an unexpected power loss event or a process crash, according to one or more embodiments.

FIG. 6 sets forth a flowchart of method steps carried out by data storage system 100 when recovering from an unexpected power loss event or a process crash, according to one or more embodiments. For example, the method steps may be performed after data storage device 100 unexpectedly loses power, or after or a process running on processor 107 of data storage device 100 crashes. Although the method steps in FIG. 6 are described in conjunction with data storage system 100 of FIGS. 1-5E, persons skilled in the art will understand that the method in FIG. 6 may also be performed with other types of computing systems, for example, any computing system that includes one or more NVRAM devices.

Prior to the method steps, data storage system 100 experiences an unexpected power loss event, or an application running on processor 107 experiences a process crash event. The event may occur before a transaction for updating data structure 510 takes place, during the transaction, or after completion of the transaction. Thus, data structure 510 may be in a consistent state, as illustrated in FIGS. 5A and 5E, or an inconsistent state, as illustrated in FIG. 5C.

As shown, a method 600 begins at step 601, in which an application interrupted by the power loss/process crash event, such as host software 121, determines whether one or more transaction logs 530 associated with the application exist in NVRAM 105A. In some embodiments, such a determination may be made based on flag 539 or any other technically feasible indication that one or more undeleted transaction logs 530 associated with the application exist in NVRAM 105A. If yes, method 600 proceeds to step 602; if no, method 600 ends, and the application runs normally, employing the current values of data structure 510 and any other data structures that are associated with the application and are stored in NVRAM 105A.

In step 602, which is performed in response to the determination that one or more transaction logs 530 associated with the application exist in NVRAM 105A, the application reads the one or more transaction logs 530 associated with the application. In embodiments in which transaction log 530 stores an old value for each of the one or more fields of data structure 510, the application reads each value from transaction log 530. As described above in conjunction with FIG. 4, in the event of power loss or process crash, metadata 531, 532, and 533 respectively associates old values A1, B1, and C1 with fields A, B, and C in data structure 510.

In step 603, the application updates the fields of data structure 510, and any other suitable data structures with associated transaction logs 530, with the valid values read in step 602. In step 604, the application deletes transaction log 530 for data structure 510 and for any other transaction logs associated with the application. In some embodiments, the application sets a value of flag 539 to indicate that data structure 510 only includes invalid data. Alternatively, the application may send a delete transaction log request to transaction service 220, which in turn deletes or otherwise indicates as invalid transaction log 530. Method 600 then ends, and the application runs normally, employing the values of data structure 510 updated in step 603. Thus, upon completion of method 600, data structure 510 is in a consistent state: if the power loss/process crash event occurs during a transaction with a data structure, the values for fields of the data structure are the values that were present in the data structure prior to the power loss/process crash event; if the power loss/process crash event occurs after completion of a transaction with the data structure, the values for fields of the data structure are the most recently updated values in the data structure.

In sum, embodiments described herein provide systems and methods that may be employed in a computing system that includes NVRAM. When an application modifies a data structure stored in NVRAM via a transaction, an interface creates a transaction log for the requested change to the data structure, where the transaction log tracks or stores the initial value of each field of the data structure in NVRAM to be updated as part of the transaction. If at any point the transaction is interrupted, for example due to an unexpected power loss or process crash, the initial, consistent values for the data structure are used upon start-up of the computing system or reinitialization of the process, thereby ensuring that the data structure is consistent before, during, and after execution of the transaction.

While the foregoing is directed to embodiments of the present invention, other and further embodiments of the invention may be devised without departing from the basic scope thereof, and the scope thereof is determined by the claims that follow.

I claim:

1. A method of atomically updating first and second old values of a data structure that is stored in a nonvolatile random access memory (NVRAM) with first and second new values, in response to storing a new key-value pair in a write buffer that is stored in the NVRAM, said method comprising the steps of:
    recording in a transaction log that is stored in the NVRAM, the first old value that is updated by the first new value;
    storing the first new value for updating the data structure in the NVRAM;
    recording in the transaction log the second old value that is updated by the second new value;
    storing the second new value for updating the data structure in the NVRAM; and
    deleting the transaction log upon completion of the steps of storing the first and second new values in the NVRAM,
    wherein the data structure is associated with key-value pairs, including the new key-value pair, that are stored in the write buffer.

2. The method of claim 1, wherein the data structure includes metadata associated with the write buffer.

3. The method of claim 1, wherein the data structure includes a first field and a second field.

4. The method of claim 3, wherein the first new value and the first old value are values for the first field.

5. The method of claim 4, wherein the second new value and the second old value are values for the second field.

6. The method of claim 1, further comprising:
    receiving a request to create the transaction log; and
    responsive to the request, creating the transaction log in the NVRAM.

7. The method of claim 1, wherein deleting the transaction log comprises receiving a request to commit a transaction associated with the first new value and the second new value.

8. The method of claim 1, wherein storing the first new value in the NVRAM comprises overwriting the first old value with the first new value.

9. A method of recovering a data structure that is stored in a nonvolatile random access memory (NVRAM), the method comprising:
    detecting that (a) a power loss event has occurred in which power is interrupted to a computing device that includes the NVRAM or (b) a process crash event has occurred in an application associated with the data structure;
    responsive to the detecting, determining that a transaction log associated with the data structure is stored in the NVRAM;
    reading a first old value and a second old value from the transaction log; and
    updating the data structure with the first old value and the second old value,
    wherein the data structure is associated with key-value pairs that are stored in a write buffer that is also stored in the NVRAM.

10. The method of claim 9, wherein determining that the transaction log is stored in the NVRAM comprises checking a value of a flag associated with the transaction log.

11. The method of claim 9, further comprising, after reading the first old value and the second old value, deleting the transaction log.

12. A computing device, comprising:
    a nonvolatile random access memory configured to store key-value pairs and a data structure associated with the key-value pairs, wherein the key-value pairs are stored in a write buffer that is also stored in the NVRAM;
    a memory that stores a transaction service algorithm; and
    a processor that is coupled to the memory and the NVRAM and, when executing the transaction service algorithm, is configured to:
        record in a transaction log in the NVRAM a first old value that is updated by the first new value;
        store the first new value for updating the data structure in the NVRAM;
        record in the transaction a second old value that is updated by the second new value;
        store the second new value for updating the data structure in the NVRAM; and
        delete the transaction log upon completion of the steps of storing the first and second new values in the NVRAM.

13. The computing device of claim 12, wherein the NVRAM comprises a volatile random access memory device coupled to a power loss protection circuit that copies contents of the volatile random access memory device into a nonvolatile storage device upon power loss.

14. The computing device of claim 13, wherein the nonvolatile storage device comprises a flash memory device.

15. The computing device of claim 12, wherein the NVRAM comprises at least one of a NOR flash memory device, a ferroelectric random access memory device, a magnetoresistive random access memory device, or a phase-change random access memory device.

16. The computing device of claim 12, wherein the data structure includes a first field and a second field.

17. The computing device of claim 16, wherein the first new value and the first old value are values for the first field.

18. The computing device of claim 17, wherein the second new value and the second old value are values for the second field.

19. The computing device of claim 12, wherein the processor is further configured to:
   receive a request to create the transaction log; and
   responsive to the request, create the transaction log in the NVRAM.

* * * * *